Dec. 15, 1970   S. R. WEISBERG   3,547,660
STAND-FORMING CONTAINER AND FLEXIBLE BAG ASSEMBLY
Filed May 23, 1967
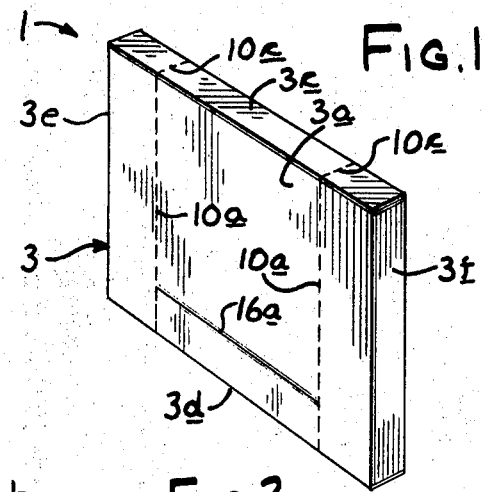
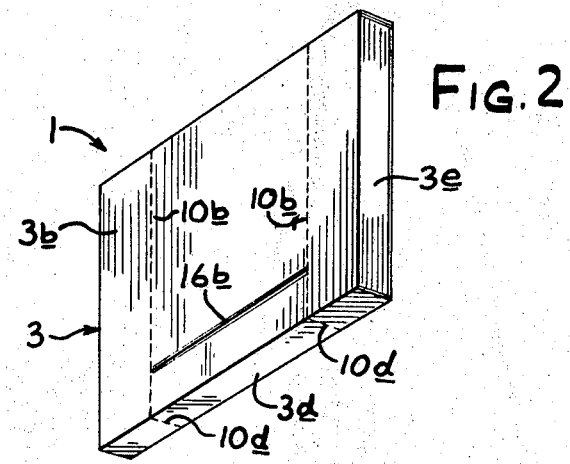
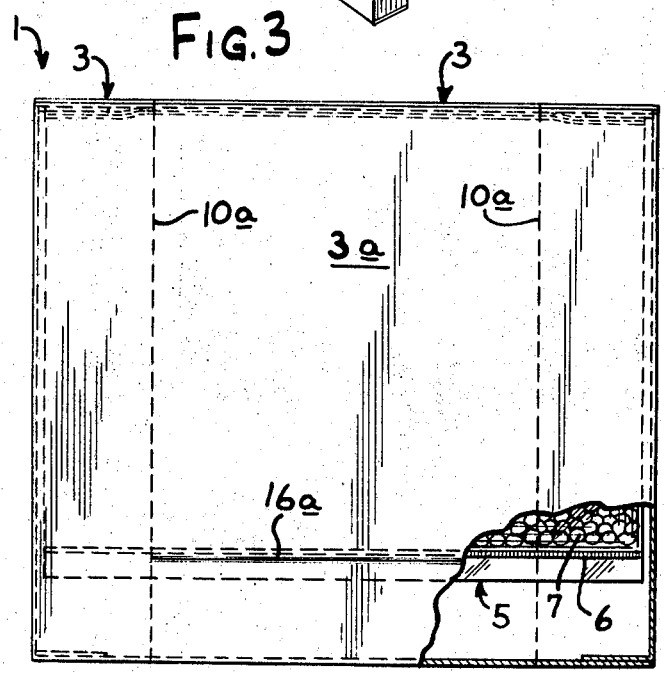
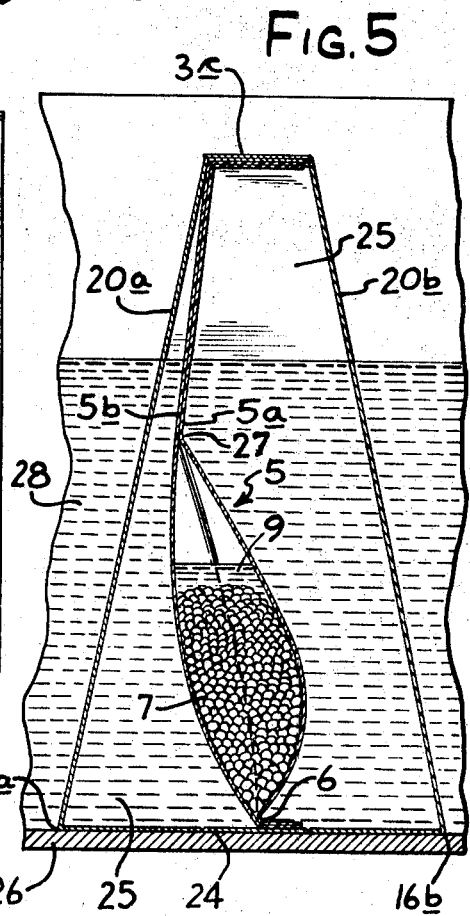
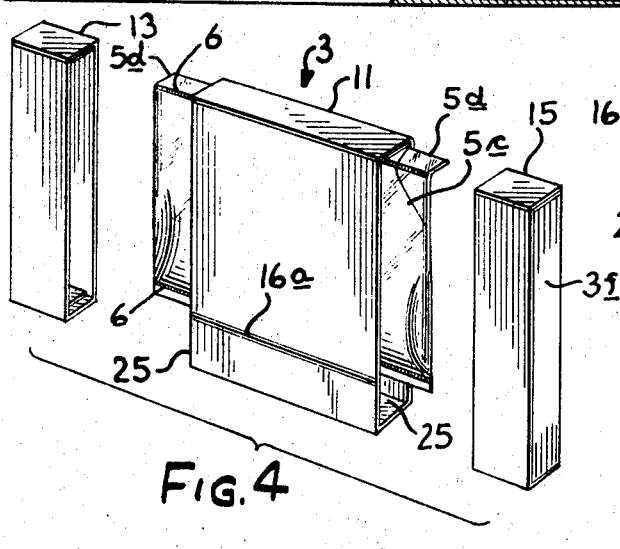
INVENTOR
SYDNEY R. WEISBERG

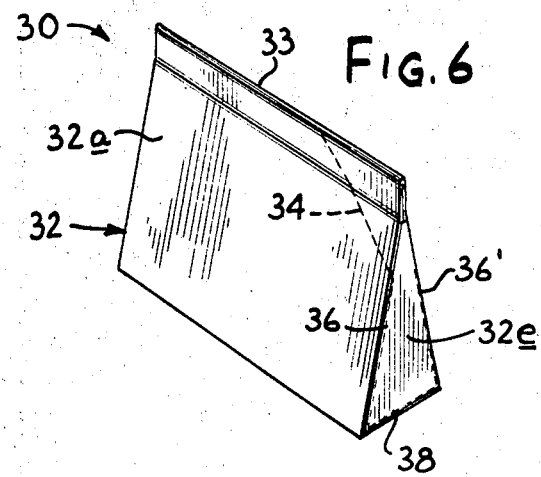
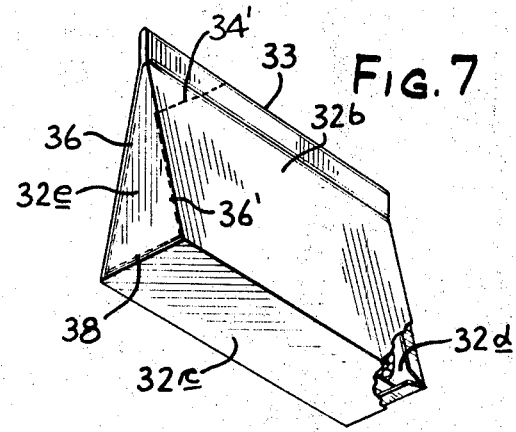
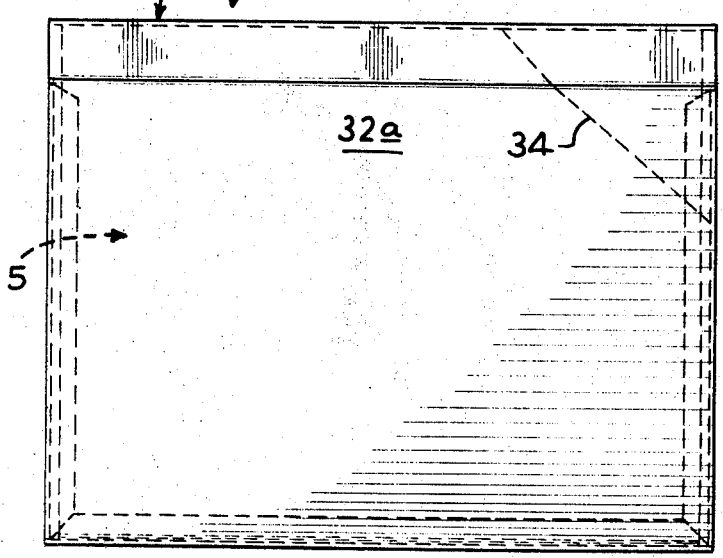
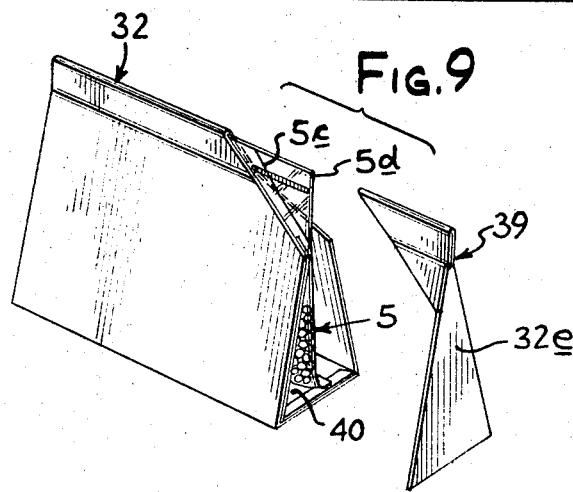
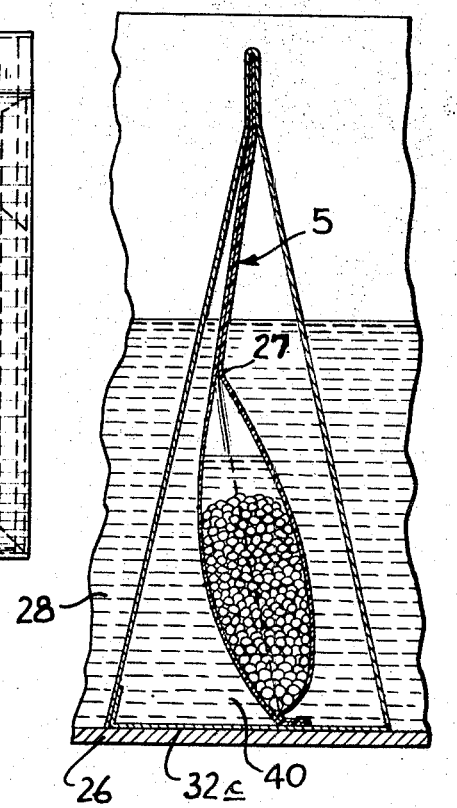
INVENTOR
SYDNEY R. WEISBERG

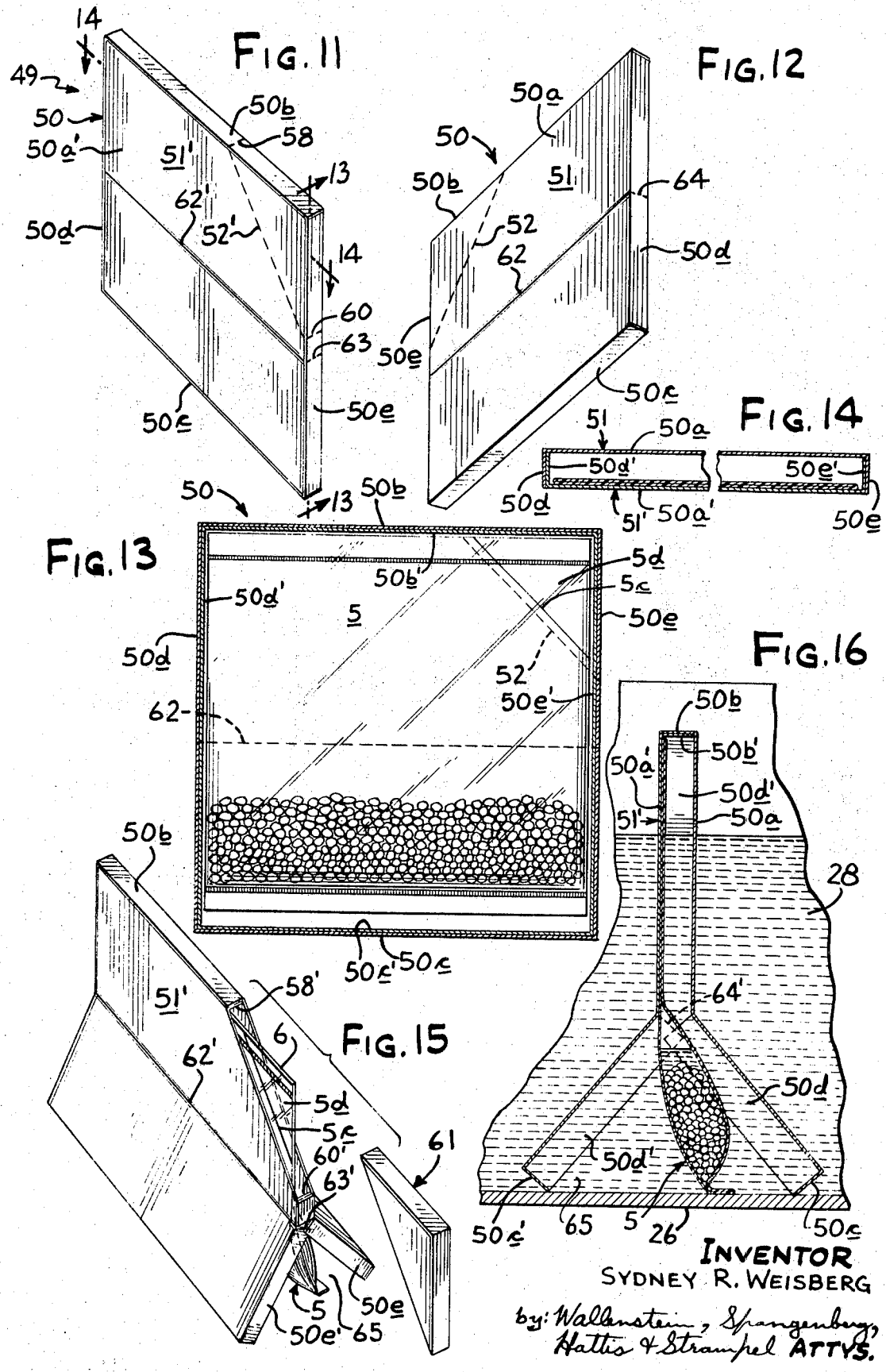

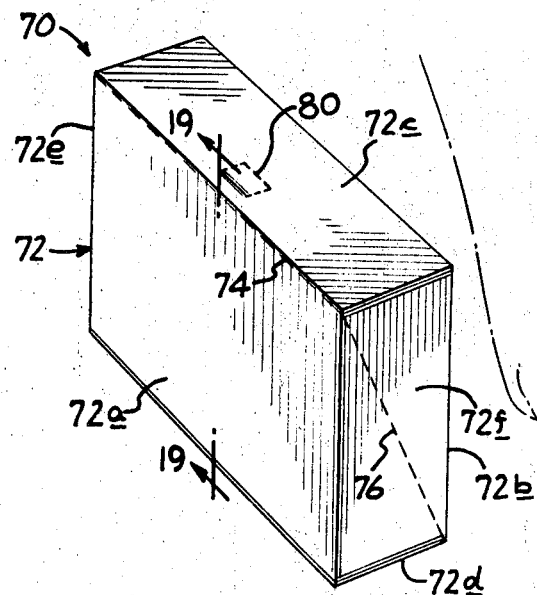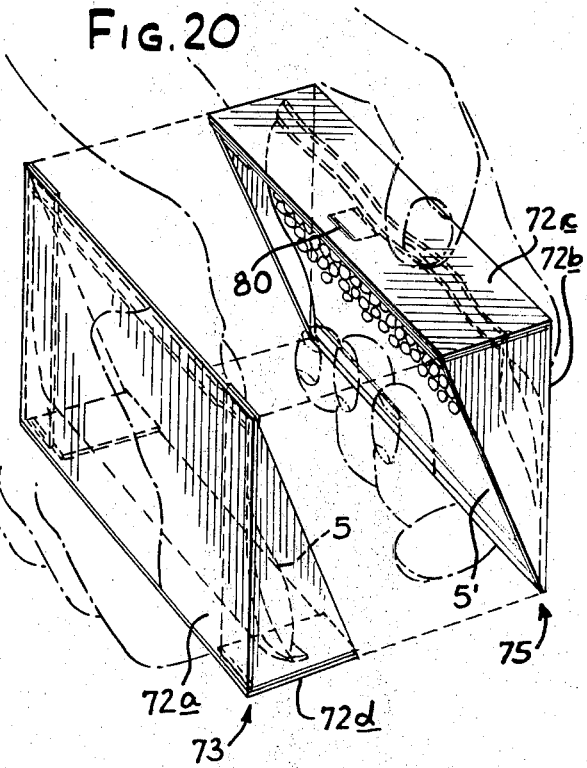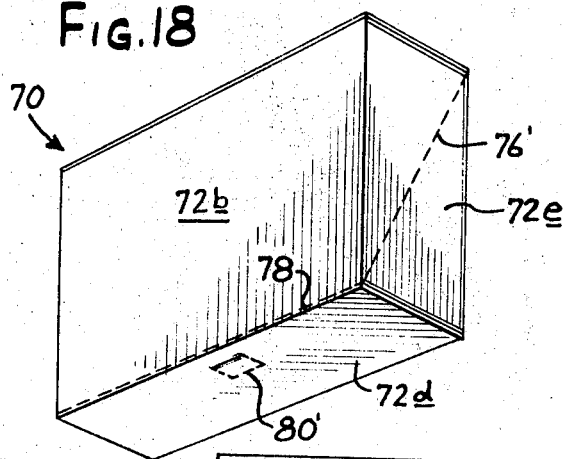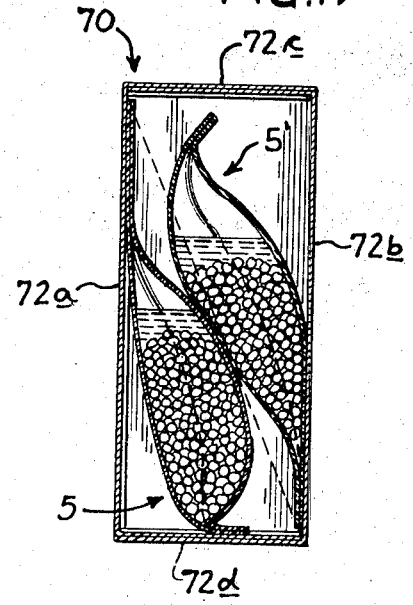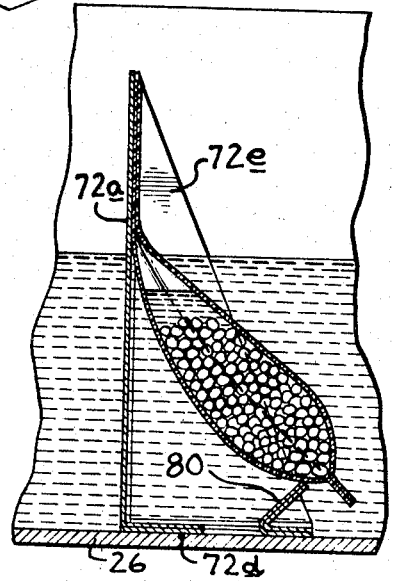

United States Patent Office 3,547,660
Patented Dec. 15, 1970

3,547,660
STAND-FORMING CONTAINER AND
FLEXIBLE BAG ASSEMBLY
Sydney R. Weisberg, 7806 S. Clyde Ave.,
Chicago, Ill. 60649
Filed May 23, 1967, Ser. No. 640,696
Int. Cl. B65b 25/22
U.S. Cl. 99—171                                     21 Claims

ABSTRACT OF THE DISCLOSURE

A non-self-supporting flexible bag having sealed therein a food product or some other material to be heated in a pot of boiling water while in the bag is secured or securable at its upper end to the upper extremity of an outer container enclosing the flexible bag on all sides thereof. The container has at least one main stand-forming body portion and one or more sections joining the main body portion along severance lines which permit the one or more sections of the container to be severed from one or more margins of the main body portion of the container to form, in one design without any folding of the main body portion and in another design by folding the same, a triangular stand with a water ingress opening in at least the lower portion of the stand which permits entry of heated water within the stand where it can flow around the food product containing portion of the bag. The upper portion of the stand is sized to extend above the level of the water in the pot and is designed to expose an upper corner of the flexible bag so the corner of the bag can readily be severed to form a pouring spout or other emptying orifice.

---

The present invention relates primarily to the packaging of food products usually sealed in transparent flat flexible bags where the food product is to be heated in a pot of hot or boiling water while the food product remains in the bag so the juices of the food product are not diluted by the water in the pot.

Generally, food containing bags of the type described are completely immersed in a pot of water and, after the food product is heated through the walls of the bag, the heated water is poured from the pot and the bag with the food contents therein is grasped while still hot by a glove, or without a glove after the bag has cooled, and the corner of the bag is opened to pour the contents thereof. The food products sold in this way are commonly meats and vegetables.

The present invention provides a unique packaging for a food product containing bag as described above which packaging overcomes the necessity for grasping the bag directly to remove the same from a pot of boiling water. In accordance with one aspect of the invention, one or more of the bags are packaged in an outer container made of cardboard or similar material. In the most preferred form of the invention, there is only one bag in each outer container. However, in a less preferred form of the invention, there are two bags in each outer container, each bag being secured to or otherwise associated with a different half of the outer container. A main body portion of the outer container associated with each bag is designed to form a triangular stand providing a relatively stable base portion when supported on a horizontal support surface by engaging the surface at widely horizontally spaced points, and an upper relatively narrow handle-forming portion which is sized to extend above the level of the water in the pot of water used to heat the food product involved. The stand-forming portion of each outer container is severable in part or completely from an adjacent part of the container so a water ingress opening is formed in the bottom portion of the stand formed therefrom into which opening the water in the pot involved can flow around the associated food product containing portion of the bag.

In the preferred form of the invention, the upper extremity of each flat bag is secured during the packaging thereof to the part of the stand-forming portion of the outer container which is to form the handle of the stand involved and at widely spaced points so that the bag will not readily tilt in the plane of the flat bag. Also, the severance lines on the outer container are designed so the stand formed therefrom will expose an upper corner of the flat bag therein so severance of the corner will form a convenient pouring spout.

Furthermore, in the most preferred form of the invention, the outer container is a thin rectangular box of cardboard or the like having an intermediate stand-forming section and removable end sections secured to the intermediate section along perforated tear lines extending along continuous vertical bands about the box and located within the outer margin lines of the bag therein. The intermediate portion of the box has horizontal fold lines in the lower portion thereof. The box is opened by severing the box along the severance lines so the end sections of the box can be removed from the intermediate stand-forming section of the box. The stand-forming section of the box is then folded along said horizontal fold lines to form an open ended triangularly shaped stand to which the bag involved is secured at the top of the stand.

In another form of the invention, the outer container is an initially triangular shaped box having one or more of the end walls of the box severable from the rest of the box to form one or more water ingress openings. Also, an upper corner portion of the box is severable therefrom to expose a spout-forming corner portion of the bag involved.

In still another form of the invention, the outer container contains two bags secured respectively to two different halves of the container, and the container has perforated severance lines to split the same into two right triangular, stand-forming halves.

The above and other advantages, forms and features of the invention will become apparent upon making reference to the specification to follow, the claims and the drawings wherein:

FIG. 1 is a perspective view of one form of package assembly of the present invention as viewed from one end thereof;

FIG. 2 is a perspective view of the package assembly of FIG. 1, as viewed from the opposite end thereof;

FIG. 3 is an enlarged front elevational view, partly broken away, of the package assembly of FIG. 1;

FIG. 4 shows the package assembly of FIGS. 1–3 with the end sections of the outer container separated from the intermediate stand-forming portion thereof;

FIG. 5 is an enlarged end view of the completed triangular stand formed from the intermediate portion of the outer container shown in FIG. 4, when supported in a pot of water;

FIG. 6 is a perspective view of a second form of the package assembly of the present invention as seen from one end thereof;

FIG. 7 is a perspective view of the package assembly of FIG. 6 as seen from the opposite end thereof;

FIG. 8 is an enlarged front elevational view of the package assembly of FIGS. 6 and 7;

FIG. 9 shows the package assembly of FIGS. 6–8 with an end section of the outer container portion of the package assembly severed from the rest of the container;

FIG. 10 is an enlarged end view of the completed triangular stand formed from the outer container shown in FIG. 9, when supported in a pot of water;

FIG. 11 is a perspective view of a third form of the package assembly of the present invention as seen from one end thereof;

FIG. 12 is a perspective view of the package assembly of FIG. 11 as seen from the opposite end thereof;

FIG. 13 is a vertical sectional view through the package assembly of FIG. 11, taken along section line 13—13 therein;

FIG. 14 is a horizontal sectional view through the package assembly of FIG. 11, taken along section line 14—14 therein;

FIG. 15 shows the package assembly of FIGS. 11–14 after an outer corner portion of the outer container thereof is severed therefrom and the bottom portion of the outer container is severed and folded to form a triangular stand;

FIG. 16 is an enlarged end view of the completed triangular stand formed from the outer container shown in FIG. 15, when supported in a pot of water;

FIG. 17 is a perspective view of a fourth form of package assembly of the present invention as seen from one end of the package assembly;

FIG. 18 is a perspective view of the package assembly of FIG. 17, as seen from the opposite end thereof;

FIG. 19 is a vertical sectional view of the package assembly of FIG. 17, taken along section line 19—19 therein;

FIG. 20 shows the manner in which the package assembly of FIGS. 17 and 18 is separable into two similar halves, each containing a flat food product containing bag; and FIG. 21 is an enlarged end view of the completed triangular stand formed from the outer container shown in FIG. 20, when supported in a pot of water.

Referring now to FIGS. 1 through 5, the package assembly there shown identified by reference numeral 1 comprises an outer container 3 made of a suitable flexible, foldable, opaque, material, such as cardboard or the like, having the usual label-forming indicia thereon (not shown) to identify the product within the container and the manufacturer. The outer container 3 encloses a non-self-supporting, flat, transparent bag 5 containing a product 7 disposable in a juice 9. As illustrated, the bag 5 is a flattened tubular body having confronting walls 5a–5b made of a thermoplastic material heat sealed together along heat seal lines 6—6.

The outer container 3 comprises a pair of relatively closely spaced front and rear vertical walls 3a and 3b, horizontal top and bottom walls 3c and 3d bridging the upper and lower margins of the front and rear walls, and vertical end walls 3e and 3f bridging the side margins of said front, rear and top and bottom walls. The front wall 3a has vertical perforated severance lines 10a—10a adjacent to but spaced from the vertical side margins and extending the full height thereof, and the rear wall 3b has corresponding vertical severance lines 10b—10b.

The top and bottom container walls 3c and 3d have a pair of severance lines 10c—10c and 10d—10d respectively extending between the ends of the severance lines 10a—10a and 10b—10b, so that the container has continuous vertical bands of perforations about the end portions of the outer container 3, to enable the ready separation of the container into a main stand-forming intermediate section 11 (FIG. 4) and end sections 13 and 15 respectively severable from the side margins of the intermediate section 11 of the outer container. Horizontal fold lines 16a and 16b are respectively formed in the container front and rear walls 3a and 3b adjacent to but spaced from the bottom of the container as by scoring the inner surface of the front and rear walls.

Preferably, the upper end of the bag 5 is secured as by a continuous heat seal or an adhesive coating to the upper wall 3c of the outer container 3 between the severance lines 10c—10c. The height of the bag 5 is substantially less than the height of the outer container 3, as best shown in FIG. 3, so the bag is elevated from the bottom of the container. The width of the bag 5 is preferably the same order of magnitude as the width of the outer container 3, so that, when the end sections 13 and 15 of the outer container are separated from the main intermediate section 11 thereof, at least the upper corners 5d—5d of the bag project beyond the intermediate section 11 of the container.

If the purchaser of the package assembly 3 desires to cook or heat up the contents of the bag 5, the outer sections 13 and 15 of the outer container are severed from the intermediate section 11 thereof as previously described, and the intermediate section 11 is then folded along the fold lines 16a and 16b to form a stand of generally triangular configuration as shown in FIG. 5. The stand thus formed comprises upwardly and inwardly inclining walls 20a and 20b formed by the portion of the side walls 3a and 3b of the container above the fold lines 16a and 16b, a top wall 3c and a horizontal bottom wall 24 formed by the flattening into a common plane of the container walls extending between the fold lines 16a–16b at the bottom portion of the container. The bottom portion of the bag 5 then rests on the bottom stand wall 24 so the stand does not have to support the full weight of the bag contents when the stand is placed on a support surface. The closely spaced upper portion of the stand forms a handle-forming portion which, when the stand and attached bag are placed in a pot 26 containing a body of water 28 to be heated, extends well above the top of the water. The removal of the end sections 13 and 15 from the intermediate section 11 of the outer container leaves water ingress openings 25—25 into which the water 28 in the pot 26 readily flow against the bag wals 5a–5b. After the contents 7 of the bag 5 are suitably cooked or heated, the purchaser grasps the upper portion of the stand projecting above the level of the water 28 and places the same on a table top or the like. A spout is then readily formed at a projecting upper corner 5d of the bag 5 by tearing or cutting the corner of the bag along a printed line 5c which may be marked on the bag. The contents of the bag 5 can then be poured by grasping the stand and tilting the same in the direction of the spout. Since the top of the bag 5 is secured to the upper wall 3c of the stand along a number of widely spaced apart points, the flat bag 5 will not tilt to any substantial degree in the plane of the bag. In the case where only a part of the contents of the bag 5 are poured from the bag, the stand and bag assembly will be placed on a horizontal support surface as shown in FIG. 5 and the weight of the bag 5 will cause a crease 26 to be formed above the contents of the bag which will seal the same from the air above the creases.

Refer now to FIGS. 6 through 9 which show a second but less preferred form 30 of the invention where an outer container 32a is provided which initially has a triangular configuration. Thus, the outer container 32 has outwardly and inwardly inclining front and rear walls 32a–32b meeting at the apex 33 at the top thereof, a bottom wall 32c extending between the bottom margins of the front and rear walls 32a and 32b, and triangular end walls 32d and 32e which extend between the side margins of said front, rear and end walls. The food product containing bag 5 within the outer container 32a may be secured in any way, for example, between the upper portions of the front and rear walls 32a and 32b, as best shown in FIG. 10. The bottom of the bag 5 rests upon the bottom wall 32c of the outer container, as shown in FIG. 10 so a seal-forming crease 26 is formed in the bag.

The front and rear walls 32a and 32b have corresponding perforated severance lines 34 and 34' extending across the corner of the outer container 32, as best shown in FIGS. 6 through 8. Perforated severance lines 36 and 36' extend downwardly from points of intersection with the severance lines 34 and 34' along the side margins of the end wall 32e. A severance line 38 running along the bottom margin of the end wall 32e extends between the bottom ends of the severance lines 36 and 36'. It is thus apparent that by running a knife or fingernail along the various intersecting severance lines 34, 34', 36, 36' and 38, an end portion 39 (FIG. 9) can be severed from the outer container to leave a water ingress opening 40 at one end of the outer container and an exposed corner 5d of the bag. The remaining portion of the outer container is a stand-forming container body which can readily be grasped at the top and placed within a pot 26 of water with the upper end of the stand projecting above the level of the water 28 therein, as shown in FIG. 10. After the contents of the bag 5 are sufficiently heated or cooked, the projecting corner 5d of the bag 5 is severed or cut along the severance line 5c to form a pouring spout as in the case of the bag previously described in connection with FIGS. 1 through 5.

Refer now to FIGS. 11 through 16 which show a further form 49 of the present invention. The package assembly 49 shown in these figures includes a rectangular shaped outer container 50 which comprises a pair of telescoping container forming sections 51 and 51'. The container section 51 comprises a main vertical wall 50a, top and bottom walls 50b and 50c, and side walls 50d and 50e. The other container section 51' has a corresponding main vertical wall 50a', top and bottom walls 50b' and 50c' and end walls 50d' and 50e'. The container section 51 has corresponding perforated inclined severance lines 52 and 52' extending across the corresponding corners of the vertical walls 50a and 50a' and perforated severance lines 59 and 60 respectively formed in the top wall 50b and side wall 50e and intersecting the ends of the severance lines 52 and 52'. Instead of providing perforated severance lines like 58 and 60 in the top wall 50b' and end wall 50e' of the container section 51', slits 58'-60' (FIG. 15) are formed in the walls 50d' and 50e' which extend across the latter and intersect the ends of the perforated severance line 52'. Thus, by running a knife or fingernail along the severance lines 52, 52', 58 and 60, an entire corner portion 61 of the outer container can be removed to expose a corner of the bag 5, as best shown in FIG. 15.

Vertical walls 50a and 50a' of the container sections 51 and 51' respectively have corresponding horizontal fold lines 62 and 62' extending across the full width thereof. The end walls 50d and 50e of the container section 51 have perforated severance lines 63 and 64 intersecting the ends of the fold line 62, and the corresponding walls 50d' and 50e' of the container section 51' have slits 63' and 64' intersecting the ends of the fold line 62'. It is thus apparent that if the perforated severance lines 63 and 64 are severed, the bottom portion of the container sections 51 and 51' can be separated to form a triangular base, as shown in FIG. 14, which readily supports the entire package assembly in an upright position. Also, water access openings 65—65 are formed in the opposite ends of the base thereby so that the water can readily flow against the walls of the bag 5 when placed in a pot 26 of water 28. The resulting stand and package assembly is used in the same way as in the other embodiments of the invention previously described.

Reference should now be made to FIGS. 17 through 21 which show a fourth form of the present invention. The package assembly 70 there shown is designed to accommodate two flexible food product containing bags 5 and 5'. The package assembly 70 includes an outer container 72 in which the bags 5 and 5' are inverted with respect to each other to be similarly associated respectively with different halves 73 and 75 of the container, as best shown in FIGS. 19 and 20. The outer container 72 has vertical front and rear walls 72a and 72b, top and bottom walls 72c and 72d and end walls 72e and 72f. A perforated severance line 74 is formed along the line of intersection between the top wall 72c and the front wall 72a. Diagonal perforated severance lines 76 and 76' are formed in the end walls 72e and 72b which lines respectively extend between the ends of the perforated severance line 74 at the corners of the end walls. A perforated severance line 78 extends between the line of intersection between the rear wall 72b and bottom wall 72d. It is thus apparent that by running a fingernail or a knife along the severance lines 74, 76, 87 and 76', the outer container 72 can be separated into two identical halves or stands 73 and 75 having a right triangular cross section.

As best shown in FIG. 19, the upper end of the bag 5 is heat sealed or otherwise secured to the inner surface of the top of the front wall 72a of container half 73 while the bottom portion of the bag 5' is similarly heat sealed or otherwise secured to the bottom portion of the rear wall 72b. When the two halves of the container are separated as described, the bags 5 and 5' will be respectively secured to the respective container halves as shown in FIG. 20. Each container half will thus form a stable support stand having a vertical wall 72a or 72b, and a bottom wall 72d and 72d'.

To increase the stability of the resultant stands 73 and 75 means are provided for supporting the bottom portion of each bag 5 or 5' at points spaced from the line of intersection of the vertical walls 72a and 72b and the bottom wall 72c or 72d of the stand. To this end, the walls 72c and 72d are respectively provided with perforated lines forming the outlines of tabs 80 and 80'. When these tabs are pushed from the planes of the associated walls to upstanding positions, the tabs form abutment walls or shoulders on the topside of which the bottom portions of the associated bags 5 and 5' can be placed, as best shown in FIG. 21.

It is thus apparent that the present invention has provided an exceedingly useful package assembly wherein the outer container initially completely encloses the one or more bags therein, and the outer container can be formed corners of the bag in each stand, and a handle-forming stands with one or more ingress openings in each opening, one or more openings which expose one or more upper corners of the bag in each stand, and a handle-forming portion on each stand adapted to project above the top of the water is a pot of water in which the assembly of a stand and bag are placed. Also, since each bag is secured to the upper portion of its stand at widely spaced points, the bag will not tilt substantially with respect to the stand, so the contents of the bag can be poured from a severed upper corner thereof by grasping the stand and tilting the same.

It should be understood that numerous modifications may be made in the preferred form of the invention described above without deviating from the broader aspects therein. For example, although it is preferred that the bags within the outer containers be initially heat sealed or adhesively secured to one or more inner surfaces of the outer container, the invention contemplates the packaging of the bags in a manner in which the bags are initially unsecured to the container walls but can be subsequently so secured after part of the container is formed into a stand.

I claim:

1. A package assembly comprising: a non-self-supporting bag made of a severable material which maintains its integrity in boiling water and having a sealed, material-holding compartment therein containing in at least the lower portions thereof a product to be heated in a pot of water while in the bag, and an outer container made of a self-supporting severable material which maintains its integrity in boiling water, the outer container having front, rear, top, bottom and end walls together completely enclosing the bag on all sides and having container wall weakening severance lines extending at least into the lower portions of the container permitting the portions of the container on opposite sides of the severance lines to be severed from the margins of a main body portion of the container to form a triangular stand-forming body with at least one boiling water ingress opening in at least the lower portion of the container where boiling water can flow into the container and around the food product containing portion of the bag, said main body portion of the container having at the top thereof a handle-forming portion adapted to project above the level of the body of water in the pot involved, the triangular stand then supporting the bag upright on the stand with the product containing portion thereof at the bottom portion of the bag.

2. The package assembly of claim 1 wherein said non-self-supporting bag has relatively closely spaced confronting walls which sealingly engage each other on all sides thereof to form a flat bag, said bag being secured to said main body portion of the container at widely spaced points along the flat sides thereof so that the bag does not readily pivot with respect to the container in the general plane thereof.

3. The package assembly of claim 1 wherein said main body portion of the container is initially of non-triangular configuration and wherein said front and rear walls have horizontally extending fold lines intermediate the top and bottom margins of the container and along which it can be folded to form a triangular stand after the outer continer is severed along said severance lines.

4. The package assembly of claim 3 wherein said non-triangular main body portion of the container initially has relatively closely spaced vertical front and rear walls; at least said front, rear, top and one of said end walls having intersecting perforated lines constituting said severance lines adjacent to but spaced from one of said end walls and within the side margin of the flexible bag, wherein one end portion of the container can completely be severed from the container.

5. The package assembly of claim 4 wherein said intersecting perforated lines also include a perforated line in said bottom wall of the container, the intersecting lines falling along a straight continuous endless band around the container, and said fold lines being horizontal lines adajcent the bottom portion of said front and rear walls.

6. The package of claim 1 wherein said outer container initially has a triangular vertical cross section so the main body portion of the container remaining after severance of said one or more sections from the margins thereof forms an apertured triangular stand without any folding thereof.

7. The package assembly of claim 1 wherein said outer container is a rectangular container comprising relatively closely spaced vertical front and rear walls, said front and rear walls having horizontal fold lines extending between the ends of the front and rear walls at the same elevation intermediate the top and bottom margins thereof, the portion of said outer container below said horizontal fold lines having severance lines at the ends and bottom of the container for separating the margins of the two bottom halves by pivoting the same along said horizontal fold lines to form a downwardly and an outwardly inclining triangular base with water ingress openings at the ends and the bottom of the container.

8. The package assembly of claim 1 wherein said outer container has relatively closely spaced vertical front and rear walls, at least said front, rear, top and one of the other contiguous walls having intersecting perforated lines constituting said severance lines adjacent to one of said end walls, and at least part of the same extending within the side margins of said bag within the container, wherein one end portion of the container can be severed as a unit from the rest of the same to expose at least one upper corner of the flexible bag.

9. The package assembly of claim 8 wherein said bottom wall of the outer container also has a perforated line intersecting said other perforated lines to form a continuous band of perforations extending around the container, wherein one complete side of the container is severable from the rest thereof to form said water ingress opening in addition to exposing said corner of the bag.

10. The package assembly of claim 1 wherein said bag is a flat flexible bag having closely spaced confronting walls and secured only at the upper part thereof to said container, the bag having a length to rest on the bottom of the stand formed from the outer container, wherein the confronting walls of the bag above the product carrying portion thereof are pressed together and creased into self-sealing relation to seal the contents of the bag from the upper portion of the bag.

11. The package assembly of claim 1 wherein said outer container initially has front and rear walls which incline downwardly and outwardly to form a triangularly shaped container, triangularly shaped end walls bridging the side margins of the front and rear walls, and a bottom wall bridging the margins of the front and rear walls, said severance lines including perforated lines in said front and rear walls extending adjacent to one of the ends of the container and when severed from the rest of the container exposing an upper corner of said bag, where an exposed corner of the bag can be severed to form a pouring spout, said severance lines also extending to the bottom portion of the container wherein at least one of said end walls can be severed from the rest of the container to provide said water ingress opening.

12. A package assembly comprising: a non-self-supporting flexible bag made of a severable material which maintains its integrity in boiling water and having a sealed, material-holding compartment therein containing a food product to be so heated in a pot of water while in the bag, and an outer container made of a self-supporting severable material which maintains its integrity in boiling water, the container having front, rear, top, bottom and end walls together enclosing the flexible bag on all sides, the container having end sections with intersecting perforated severance lines along which the end sections are severable completely from the main portion of the container which forms a triangular stand with openings at the ends of the container extending completely from the bottom to the top thereof.

13. The package assembly of claim 12 wherein the bag is initially secured only to the upper extremity of the outer container and only between said severance lines, and the main portion of the outer container after severance of the end sections being foldable into said triangular stand.

14. The package assembly of claim 12 wherein the outer container initially has a rectangular shape with relatively closely spaced vertical front and rear walls, horizontal top and bottom walls bridging the upper and lower margins of the front and rear walls, and vertical end walls bridging the side margins of the front, rear, top and bottom walls; said front and rear walls each have a vertical severance line adjacent to but spaced from each vertical side margin thereof and the top and bottom walls of the container each having a pair of severance lines extending between the adjacent ends of the vertical severance lines on said front and rear walls, wherein adjacent each side of the container there are a series of intersecting severance lines forming a continuous severance band about the container whereby each end section of the container can be severed from the central portion thereof to provide openings at each end of the container; and there are provided on said front and rear walls horizontal fold lines extending between said vertical severance lines adjacent to but spaced from the bottom of the container; the bottom portion of said front and rear walls and said bottom wall of the container being foldable into a common horizontal plane after severance of said end sections of said container, whereby a triangular stand is formed for the bag within the container.

15. A package assembly comprising: an outer container having relatively closely spaced rectangular vertical front and rear walls, horizontally rectangular top and bottom walls bridging the upper and lower margins of said front and rear walls and rectangular vertical end walls bridging the side margins of said front, rear, top and bottom walls; perforated severance lines extending diagonally across the corners of said end walls of the container; an upper perforated severance line extending between the ends of said diagonal perforated severance lines in said end walls and along the line of intersection between said top wall and one of said front and rear walls; a lower perforated severance line extending between the bottom ends of said diagonal perforated severance lines in said end walls and along the line of intersection of the other of said front and rear walls and said bottom wall, whereby said container can be split into two similar halves by tearing said container along all of said perforated severance lines; a pair of non-self-supporting flexible bags each having a sealed material holding portion therein containing a food product to be heated in a pot of water while in the bag, said bags being respectively secured to said respective container halves wherein, upon separation of said container into said container halves, each bag is secured to a different container half which forms a right triangular support stand therefor.

16. The package assembly of claim 15 wherein the top and bottom walls of the outer container have means for forming an upstanding bag abutment wall which, when the associate container half is severed from the rest of the container to form a stand, holds the bottom portion of the associated bag in spaced relation to the associated vertical wall of the stand.

17. A self-supporting container and stand assembly comprising: a non-self-supporting flexible bag having relatively closely spaced front and rear walls forming a flat bag construction, and a stand for supporting the bag in an upright position and including an upstanding wall, a bottom wall extending from the botom margin of the upstanding wall to form a support base for the stand and side walls extending between the side margins of said upstanding and bottom walls, said stand being open at the top and the side remote from said upstanding wall so the stand has a generaly right triangular shape, and said flexible bag being connected to said stand only at the upper portion thereof where it is secured at two widely horizontally spaced points to said upstanding wall of the stand, wherein the bag cannot readily tilt with respect to the stand in the plane of the bag, the distance between the bottom of said bag and the points of connection thereof to said upstanding wall of the stand being substantially greater than the distance between the bottom of the upstanding wall of the stand and said points of connection of the bag thereto, wherein the bottom of the bag can be bodily moved away from said upstanding wall and be supported from said bottom wall of the stand at points substantially spaced from the upstanding wall.

18. The container and stand assembly of claim 17 wherein said bottom wall of the stand has abutment wall-forming means projecting upwardly therefrom at points thereof spaced substantially from the points of intersection of the bottom wall and said upstanding wall, the bottom of said bag engaging said abutment wall-forming means, wherein the bottom of the bag is held in spaced relation from said upstanding wall.

19. A package assembly comprising: a non-self-supporting bag made of a severable material which maintains its integrity in boiling water and having a sealed, material-holding compartment therein containing a product to be heated in a pot of water while in the bag, and an outer container made of a self-supporting severable material which maintains its integrity in boiling water, the outer container having relatively closely spaced front and rear wall and relatively narrow top, bottom and end walls between said front and rear walls, thereby forming a container which is unstable when stood on the narrow bottom wall thereof, said front and rear walls having corresponding horizontally extending fold lines at an elevation between the top and bottom thereof and along which fold lines the container can be folded, the fold lines being positioned so the outward folding of the portions of the front and rear walls below the fold lines forms a stable triangular stand which is much wider at the bottom than the top thereof for supporting the bag within a pot of boiling water, and said container having a height to project above the boiling water in the pot so it can be grasped to remove the same and the bag carried thereby from the pot.

20. The package assembly of claim 19 wherein said container has wall weakening severance lines along some of said walls which weakened severance lines enable portions of the container on opposite sides thereof to be severed from one another to permit said front and rear walls to be folded along said fold lines.

21. The package assembly of claim 20 wherein the severance of said container along said severance lines also form a container with at least one water ingress opening in at least the lower portion of the container where boiling water can flow into the container and around the food product containing portion of the bag.

References Cited
UNITED STATES PATENTS

| | | | |
|---|---|---|---|
| 3,114,643 | 12/1963 | Boston et al. | 99—171 |
| 3,144,129 | 8/1964 | Weisberg | 206—56 |

FRANK W. LUTTER, Primary Examiner

STEVEN H. MARKOWITZ, Assistant Examiner

206—56; 229—51